(12) United States Patent
Eom et al.

(10) Patent No.: US 9,966,748 B1
(45) Date of Patent: May 8, 2018

(54) ONE-BOLT TYPE JUNCTION BOX

(71) Applicant: YOUNG HWA TECH CO., LTD., Chungcheongnam-do (KR)

(72) Inventors: Jun Hyong Eom, Chungcheongnam-do (KR); Tae Jae Lim, Chungcheongnam-do (KR)

(73) Assignee: YOUNG HWA TECH CO., LTD., Chungcheongnam-do (KR)

( * ) Notice: Subject to any disclaimer, the term of this patent is extended or adjusted under 35 U.S.C. 154(b) by 0 days. days.

(21) Appl. No.: 15/612,842

(22) Filed: Jun. 2, 2017

(30) Foreign Application Priority Data

Dec. 23, 2016 (KR) ........................ 10-2016-0177668

(51) Int. Cl.
| | | |
|---|---|---|
| *H05K 5/00* | (2006.01) |
| *H02G 3/08* | (2006.01) |
| *H02G 3/16* | (2006.01) |
| *H01R 4/34* | (2006.01) |
| *H01R 13/10* | (2006.01) |
| *H02G 3/14* | (2006.01) |
| *H01R 13/516* | (2006.01) |

(52) U.S. Cl.
CPC ................ *H02G 3/16* (2013.01); *H01R 4/34* (2013.01); *H01R 13/10* (2013.01); *H01R 13/516* (2013.01); *H02G 3/14* (2013.01)

(58) Field of Classification Search
CPC ...... H05K 5/00; H05K 5/0008; H05K 5/0026; H05K 5/0047; H05K 5/02; H05K 5/0204; H05K 5/0217; B60R 16/023; B60R 16/0239; B60R 16/00; B60R 16/005; B60R 16/02; B60R 16/03; B60R 16/0231; H02G 3/08; H02G 3/081; H02G 3/16; H02G 3/14; H01R 13/6215; H01R 13/621; H01R 13/6205; H01R 13/627; H01R 4/34; H01R 13/10; H01R 13/516
USPC ........... 174/50, 520, 542, 535, 560–563, 57; 439/535, 949, 364, 365; 220/3.2, 4.02; 361/728, 600, 641, 730, 732, 796, 626
See application file for complete search history.

(56) References Cited

U.S. PATENT DOCUMENTS 4,627,759 A * 12/1986 Kato .................. H01R 13/6215
439/364
4,956,748 A * 9/1990 Yamamoto ............. H05K 7/026
361/730

(Continued)

FOREIGN PATENT DOCUMENTS

| KR | 100796715 | 1/2008 |
| KR | 101609705 | 4/2016 |

*Primary Examiner* — Angel R Estrada
(74) *Attorney, Agent, or Firm* — IP & T Group LLP

(57) ABSTRACT

A one-bolt type junction box includes a main body in which electrical parts are installed, a lower cover configured to cover a lower portion of the main body, sockets installed on a lower surface of the main body, side connectors installed in the lower cover so as to be coupled to the sockets, a single fixing bolt installed in the main body, a single fixing nut provided in the lower cover so as to be threadedly coupled to the fixing bolt, a central connector mounted in a central portion of the junction box in which the fixing bolt and the fixing nut are disposed, and a connector seating member in which the central connector is seated. The central connector is configured to be mounted on the lower cover in a state in which the central connector is seated on the connector seating member.

12 Claims, 7 Drawing Sheets

(56) References Cited

U.S. PATENT DOCUMENTS

| | | | | |
|---|---|---|---|---|
| 5,023,752 | A * | 6/1991 | Detter | H05K 7/026 |
| | | | | 439/76.2 |
| 5,271,689 | A * | 12/1993 | Ishii | H01R 13/6215 |
| | | | | 439/364 |
| 5,771,151 | A * | 6/1998 | Hotea | B60R 16/0238 |
| | | | | 361/626 |
| 6,027,360 | A * | 2/2000 | Jenkins | H01R 13/6215 |
| | | | | 439/248 |
| 6,126,458 | A * | 10/2000 | Gregory, II | H01R 13/6215 |
| | | | | 439/76.2 |
| 6,443,779 | B2 * | 9/2002 | Suzuki | H01R 13/514 |
| | | | | 439/76.2 |
| 6,930,248 | B1 * | 8/2005 | Saka | H02G 3/086 |
| | | | | 174/50 |
| 7,394,018 | B2 * | 7/2008 | Saka | H02G 3/086 |
| | | | | 174/50 |
| 7,888,596 | B2 * | 2/2011 | Kanamaru | H02G 3/088 |
| | | | | 174/50 |
| 8,208,264 | B2 * | 6/2012 | Heim | F16H 59/105 |
| | | | | 174/520 |
| 9,346,422 | B2 * | 5/2016 | Kouzaki | B60R 16/0238 |

* cited by examiner

ONE-BOLT TYPE JUNCTION BOX

CROSS-REFERENCE TO RELATED PATENT APPLICATION

This application claims the benefit of Korean Patent Application No. 10-2016-0177668 dated Dec. 23, 2016. The disclosure of the above patent applications is hereby incorporated herein by reference in their entirety.

TECHNICAL FIELD

The present invention relates to a one-bolt type junction box in which electrical parts used for a motor vehicle or the like are concentrated and, more particularly, to a one-bolt type junction box in which a connector is mounted even in a bolt-coupled central portion of the junction box so that it is possible to effectively use a space of the central portion of the junction box, to easily fix and remove a connector to and from the central portion, and to increase the capacity of the junction box without increasing the size thereof.

BACKGROUND ART

In general, a junction box is used for concentrating electrical parts such as fuses, relays and the like in a motor vehicle.

As shown in FIG. 1, the junction box includes a main body 10 in which a plurality of electrical parts E is installed, an upper cover 20 configured to cover an upper portion of the main body 10, a lower cover 30 configured to cover a lower portion of the main body 10, sockets 12 installed on a lower surface of the main body 10 so as to be connected to the electrical parts E, and connectors 32 installed in the lower cover 30 so as to be coupled to the sockets 12.

The junction box further includes a plurality of fastening bolts 40 installed in the main body 10 and a plurality of fastening nuts (not shown) installed in the respective connectors 32 so as to be threadedly coupled to the fastening bolts 40.

The fastening bolts 40 are installed in the main body 10 so as to extend toward the respective connectors 32 of the lower cover 30. The fastening bolts 40 thus installed are threadedly coupled to the fastening nuts of the connectors 32.

When the fastening bolts 40 are rotated in a forward direction, the fastening nuts threadedly coupled to the fastening bolts 40 are moved upward along the fastening bolts 40 while making a screw motion, whereby the connectors 32 are moved upward together with the fastening nuts. Thus, the respective connectors 32 of the lower cover 30 are coupled to the sockets 12 of the main body 10.

When the fastening bolts 40 are rotated in a reverse direction, the fastening nuts are moved downward along the fastening bolts 40 while making a screw motion, whereby the connectors 32 are moved downward together with the fastening nuts. Thus, the respective connectors 32 of the lower cover 30 are separated from the sockets 12 of the main body 10.

As a result, in response to the operation conducted by a worker, the fastening bolts 40 and the fastening nuts serve to raise or lower the connectors 32 of the lower cover 30 so that the connectors 32 are coupled to or separated from the sockets 12.

However, in the conventional junction box mentioned above, the bolting structures of the fastening bolts 40 and the fastening nuts for coupling or separating the connectors 32 and the sockets 12 are installed for each of the connectors 32. The conventional junction box has a drawback in that the structure thereof is complex and a large number of parts are required. This leads to a problem that the manufacturing cost increases.

Furthermore, since the bolting structures of the fastening bolts 40 and the fastening nuts are installed for each of the connectors 32, the respective fastening bolts 40 needs to be individually operated one by one in order to couple or separate the connectors 32 and the sockets 12. For this reason, there is posed a problem in that the work of coupling and separating the connectors 32 and the sockets 12 is very onerous and time-consuming.

Moreover, since the bolting structures of the fastening bolts 40 and the fastening nuts are installed for each of the connectors 32, it is necessary to provide additional installation spaces in the connectors 32 and the main body 10. This poses a problem in that a loss of spaces occurs.

In particular, in the case of the main body 10 and the connectors 32, the space for installation of terminals and electrical parts is narrowed due to the bolting structures of the fastening bolts 40 and the fastening nuts. This poses a problem in that the configuration and arrangement of electrical parts are accompanied by a lot of restrictions.

In addition, the conventional junction box has a drawback in that during the course of raising and lowering the connectors 32 with the bolting structure, variations are generated in the raising and lowering amounts of the respective connectors 32.

Particularly, the raising and lowering amounts in the portions located away from the bolting structures are smaller than the raising and lowering amounts in the portions located close to the bolting structures. Such variations in the raising and lowering amounts in the respective portions may significantly reduce the ease of coupling of the connectors 32 with respect to the sockets 12. This poses a problem in that the sockets 12 and the connectors 32 may not be coupled to each other or may be coupled in a poor state.

In addition, the conventional junction box has a structure in which the connectors 32 are coupled to or separated from the sockets 12 of the main body 10 while moving upward or downward. Therefore, the length of wire harnesses 32a connected to the connectors 32 needs to be designed in view of the vertical movement stroke of the connectors 32.

Inasmuch as the length of the wire harnesses 32a has to be designed in conformity with the vertical movement stroke of the connectors 32, there is posed a problem that the manufacturing cost increases.

In order to solve the problems mentioned above, a one-bolt type junction box is disclosed in Korean Patent Application Publication No. 2015-173815.

As shown in FIGS. 2 and 3, the one-bolt type junction box disclosed in Korean Patent Application Publication No. 2015-173815 includes a main body 10 in which electrical parts E are installed, an upper cover 20 configured to cover an upper portion of the main body 10, a lower cover 30 configured to cover a lower portion of the main body 10, one or more sockets 12 installed on a lower surface of the main body 10, and one or more connectors 32 installed in the lower cover 30 so as to be coupled to the sockets 12. In the junction box, a single fixing bolt 60 is installed in the main body 10, and a single fixing nut 70 capable of being threadedly coupled to the fixing bolt 60 is installed in the lower cover 30. The main body 10 is moved upward or downward with respect to the connectors 32 through the use of the bolting structure of the fixing bolt 60 and the fixing nut 70. By conducting a bolting operation only once, it is possible to cause the sockets 12 of the main body 10 to be moved upward or downward with respect to the connectors 32 of the lower cover 30 so that the sockets 12 can be coupled to or separated from the connectors 32.

The one-bolt type junction box cited above further includes a guide means 80 for guiding the up/down movement of the main body 10 with respect to the connectors 32 of the lower cover 30.

The guide means 80 includes a plurality of guide rods 84 extending from the main body 10 toward the lower cover 30, and a plurality of guide tubes 82 configured to accommodate the guide rods 84 vertically moved together with the main body 10 and installed in the lower cover 30 so as to guide the up/down movement of the guide rods 84.

In the one-bolt type junction box cited above, the connectors 32 and the sockets 12 can be coupled and separated through the use of one bolt. It is therefore very easy and convenient to couple and separate the connectors 32 and the sockets 12. It is also possible to reduce the number of parts as far as possible and to save the manufacturing cost.

Moreover, in the one-bolt type junction box cited above, the connectors 32 and the sockets 12 can be coupled and separated even in a narrow space. Thus, the one-bolt type junction box is superior in maintainability and is capable of preventing poor connection between the sockets 12 and the connectors 32.

Since the connectors 32 and the sockets 12 can be coupled and separated through the use of one bolt, it is possible to prevent wear of parts which may occur at the time of coupling and separating the connectors 32 and the sockets 12. It is also possible to prevent reduction of the assembling accuracy.

However, as a result of actually applying and using the one-bolt type junction box cited above, the following drawbacks were found.

First, in the one-bolt type junction box cited above, as shown in FIG. 2, the fixing bolt 60 and the fixing nut 70 are disposed in the central portion of the junction box. Thus, a large space is generated in the central portion. This restricts the space in which the connectors can be accommodated.

Second, the one-bolt type junction box cited above has a problem in that three wire harnesses applied to up-to-date motor vehicles cannot be connected to the junction box.

In the up-to-date motor vehicles, the wire harnesses are composed of three wire harnesses for an engine, a body and a front part. However, the one-bolt type junction box cited above has a structure capable of accommodating only two connectors. Therefore, in order to connect three wire harnesses, it is necessary to increase the size of the junction box or to install an additional junction box.

PRIOR ART DOCUMENTS

Patent Documents

Patent document 1: KR 10-0796715 B1
Patent document 1: KR 10-1609705 B1

SUMMARY OF THE INVENTION

In view of the aforementioned problems inherent in the related art, it is an object of the present invention to provide a one-bolt type junction box capable of increasing the capacity of the junction box without increasing the size of the junction box.

Another object of the present invention is to provide a one-bolt type junction box capable of connecting three wire harnesses without increasing the size of the junction box.

A further object of the present invention is to provide a one-bolt type junction box capable of mounting three connectors without increasing the size of the junction box and capable of eliminating the need to use an additional junction box.

According to one embodiment of the present invention, there is provided a one-bolt type junction box, including: a main body in which electrical parts are installed; a lower cover configured to cover a lower portion of the main body; sockets installed on a lower surface of the main body; side connectors installed in the lower cover so as to be coupled to the sockets; a single fixing bolt installed in the main body; a single fixing nut provided in the lower cover so as to be threadedly coupled to the fixing bolt; a central connector mounted in a central portion of the junction box in which the fixing bolt and the fixing nut are disposed; and a connector seating member in which the central connector is seated, wherein the central connector is configured to be mounted on the lower cover in a state in which the central connector is seated on the connector seating member.

In the one-bolt type junction box, the connector seating member may include a penetration portion, and the fixing nut may include a central guide portion to which the penetration portion of the connector seating member is fitted.

In the one-bolt type junction box, the central guide portion of the fixing nut may be formed in a circular shape or a rectangular shape.

In the one-bolt type junction box, the connector seating member may have a form of a rectangular tube with an upper portion thereof opened and may include a penetration portion extending upward from a center of the connector seating member and configured to be fitted to a central guide portion of the fixing nut, an opening portion formed on a side surface of the connector seating member so that a wire harness connected to the central connector passes through the opening portion, and engagement projections formed on a side surface of the connector seating member so as to engage with the lower cover.

In the one-bolt type junction box, the penetration portion may be formed in a circular shape or a rectangular shape.

In the one-bolt type junction box, the central connector may include an opening portion formed at the center thereof, and the connector seating member may include a penetration portion configured to be inserted into the opening portion.

In the one-bolt type junction box, the opening portion may be formed in a circular shape or a rectangular shape.

The one-bolt type junction box may further include: a guide means configured to guide up-down movement of the main body with respect to the side connectors of the lower cover, wherein the guide means includes a plurality of guide rods extending from the main body toward the lower cover, and a plurality of guide tubes configured to accommodate the guide rods and installed in the lower cover so as to guide up-down movement of the guide rods.

In the one-bolt type junction box, the guide rods and the guide tubes may be formed in a circular cross-sectional shape or a rectangular cross-sectional shape.

In the one-bolt type junction box, the fixing nut may be configured to, when tightening or loosening the fixing bolt, allow the fixing bolt to threadedly move upward or downward so that the main body and the sockets are raised or lowered with respect to the side connectors of the lower cover.

In the one-bolt type junction box, the fixing nut may be insert-molded when injection-molding the lower cover.

In the one-bolt type junction box, the fixing nut may be installed in the lower cover by caulking.

According to the one-bolt type junction box of the present invention, it is possible to additionally install a connector without increasing the size of the junction box. This makes it possible to optimize the use of a space and to increase the capacity of the junction box.

Furthermore, it is possible to mount three connectors without changing the external shape of the junction box.

In addition, it is possible to connect three wire harnesses to the junction box without increasing the size of the junction box and to eliminate the need to use an additional junction box, thereby saving the manufacturing cost.

DETAILED DESCRIPTION

Figure 1:
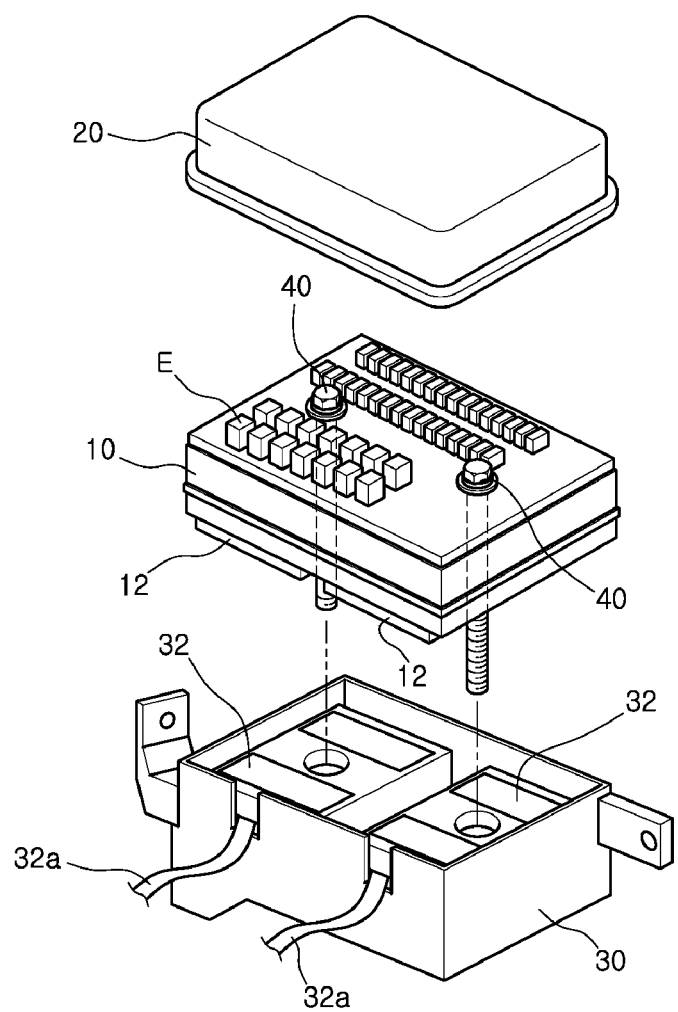
FIG. 1 is an exploded perspective view showing one example of a conventional junction box.

A preferred embodiment of a one-bolt type junction box according to the present invention will now be described in detail with reference to the accompanying drawings. The same constituent elements as those of the conventional example cited above will be designated by like reference numerals.

Prior to describing the characterizing parts of the one-bolt type junction box according to the present invention, the structure of the one-bolt type junction box will be described with reference to FIGS. 2 and 3.

Figure 2:
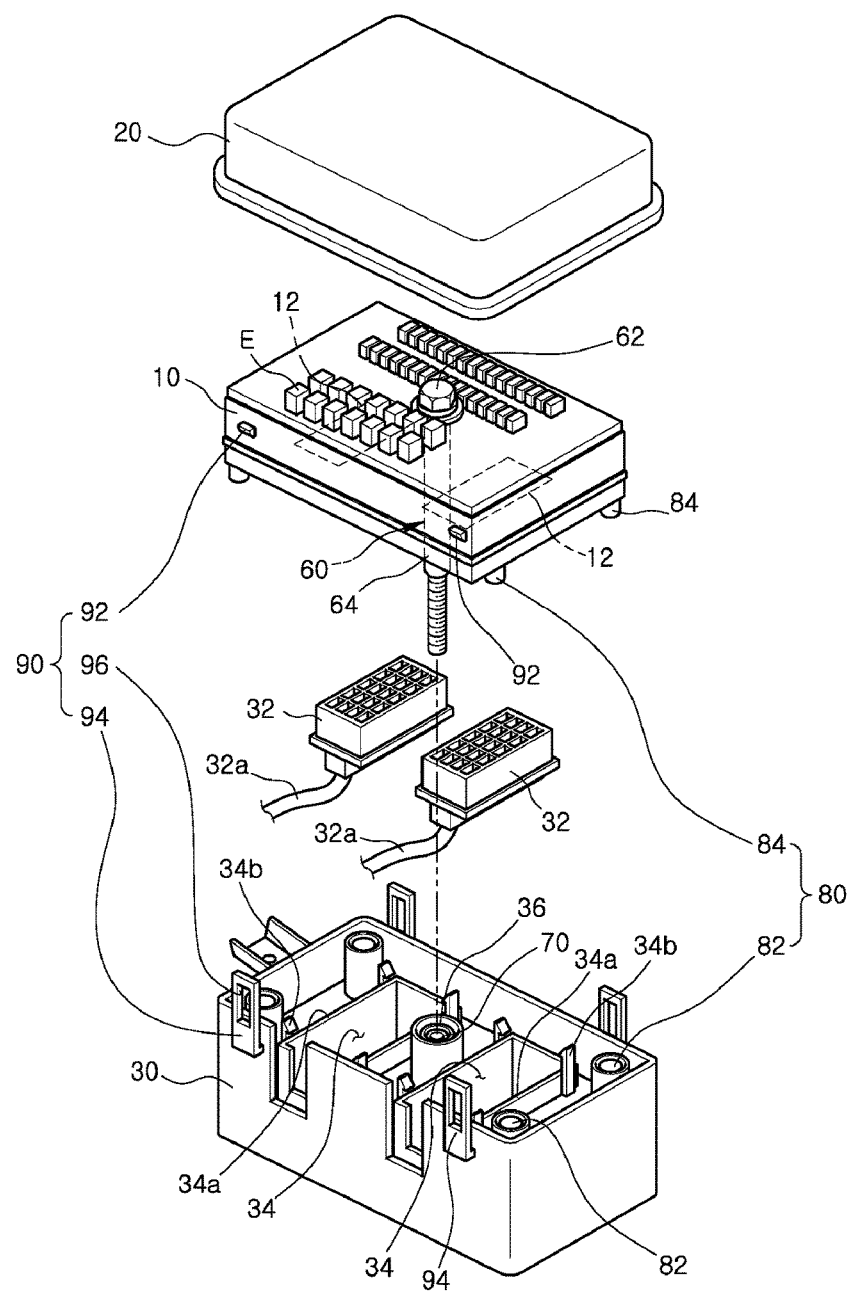
FIG. 2 is an exploded perspective view showing a conventional one-bolt type junction box.
Figure 3:
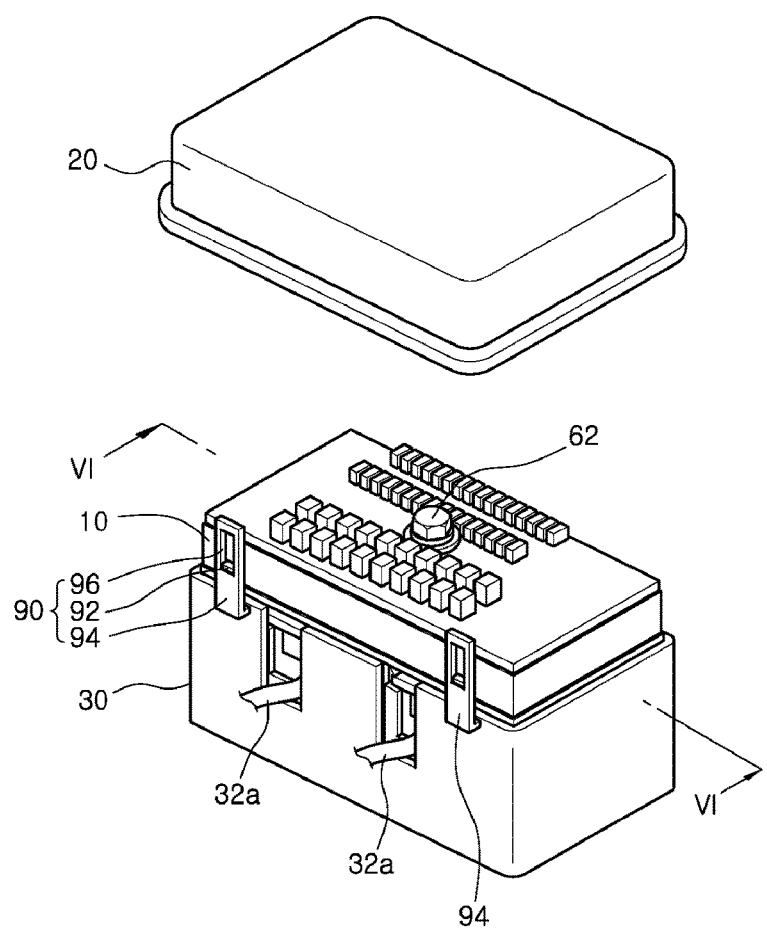
FIG. 3 is a perspective view showing a conventional one-bolt type junction box in which a lower cover is assembled with a main body.

As shown in FIG. 2, the one-bolt type junction box includes a main body 10 on which a plurality of electrical parts E is mounted. Sockets 12 are installed on a lower surface of the main body 10. A cover 20 is assembled with an upper surface of the main body 10.

The upper cover 20 covers the upper portion of the main body 10 to protect the electrical parts E mounted on the main body 10.

The one-bolt type junction box further includes a lower cover 30 configured to cover the lower portion of the main body 10. Connectors 32 are installed in the lower cover 30.

The connectors 32, which correspond to the respective sockets 12 of the main body 10, are configured to be connected to the sockets 12.

The connectors 32 having such a configuration serve to supply the electric signals of the electrical parts E transmitted via the sockets 12 to the respective electrical devices of a motor vehicle through wire harnesses 32a.

The lower cover 30 is provided therein with connector installation recesses 34 for installing the connectors 32.

The connector installation recesses 34 are provided with connector support portions 34a formed in the form of ribs inside the lower cover 30. The connector support portions 34a are configured to support the peripheral shoulder portions of the connectors 32.

The connector installation recesses 34 are provided with connector fixing hooks 34b. The connector fixing hooks 34b are installed in pair in both sidewalls of the connector installation recesses 34.

The connector fixing hooks 34b thus installed are configured to engage with the shoulders of the connectors 32 supported on the connector support portions 34a.

Thus, the connectors 32 fixed to the lower cover 30 can be connected to the respective sockets 12 of the main body 10.

The one-bolt type junction box further includes a single fixing bolt 60 installed in the main body 10 and a single fixing nut 70 installed in the lower cover 30 in a corresponding relationship with the fixing bolt 60.

The fixing bolt 60 includes a head portion 62 and a body portion 64. The head portion 62 is rotatably supported on the upper surface of the main body 10. The body portion 64 passes through the main body 10 and extends toward the fixing nut 70 of the lower cover 30.

It is preferred that the fixing bolt 60 is installed in the central portion of the main body 10. This is to make sure that the tightening force of the fixing bolt 60 acts on the central portion of the main body 10 when the fixing bolt 60 is threadedly tightened to the fixing nut 70 of the lower cover 30. Thus, the tightening force of the fixing bolt 60 is uniformly transmitted from the central portion to the peripheral portion of the main body 10 in a balanced manner.

The fixing nut 70 is fixedly installed inside a vertical tube 36 disposed in the central region of the lower cover 30. The fixing nut 70 thus installed is threadedly coupled to the fixing bolt 60 of the main body 10.

Since the fixing nut 70 fixed to the lower cover 30 is threadedly coupled to the fixing bolt 60 of the main body 10, the fixing bolt 60 can make a screw motion in the vertical direction along the fixing nut 70.

Accordingly, the main body 10 is moved upward and downward in the vertical direction together with the fixing bolt 60. Thus, the sockets 12 installed on the lower surface of the main body 10 are raised or lowered in the vertical direction so that the sockets 12 can be coupled to or separated from the connectors 32 of the lower cover 30.

As a result, the fixing bolt 60 and the fixing nut 70 causes the main body 10 to move upward or downward, whereby the sockets 12 of the main body 10 are raised or lowered so as to be coupled to or separated from the connectors 32 of the lower cover 30.

In this regard, it is preferred that the fixing nut 70 is insert-molded at the time of injection-molding the lower cover 30. However, the present invention is not limited thereto. If necessary, the fixing nut 70 may be fixed inside the vertical tube 36 by caulking.

It is preferred that the fixing nut 70 is fixedly installed in the lower cover 30 in the central portion of the lower cover 30. In particular, it is preferred that the fixing nut 70 is installed between the connector installation recesses 34.

The reason for adopting this configuration is to make sure that when tightening the fixing bolt 60, the tightening force of the fixing bolt 60 with respect to the fixing nut 70 acts on the central portion of the lower cover 30 between the connector installation recesses 34.

Thus, the tightening force of the fixing bolt 60 can be uniformly transmitted to the respective connectors 32 installed in the connector installation recesses 34 in a balanced manner. As a result, the coupling forces of the sockets 12 of the main body 10 with respect to the connectors 32 of the lower cover 30 are balanced. Accordingly, the connectors 32 of the lower cover 30 and the sockets 12 of the main body 10 are smoothly connected without the likelihood of poor connection.

As shown in FIG. 2, the one-bolt type junction box further includes a guide means 80 for guiding the up/down movement of the main body 10 and the upper cover 20 with respect to the lower cover 30.

The guide means 80 includes a plurality of guide tubes perpendicularly installed on the lower cover 30 and a plurality of guide rods 84 installed in the main body 10 so as to be movably inserted into the guide tubes 82.

The guide tubes 82 are perpendicularly installed at four corners of the lower cover 30. The guide tubes 82 thus installed accommodate the guide rods 84 of the main body 10 and guide the up-down movement of the guide rods 84 accommodated in the guide tubes 82.

The guide rods 84 extend from the lower surface of the main body 10 toward the respective guide tubes 82 of the lower cover 30. When the main body 10 is assembled with the lower cover 30, the guide rods 84 are accommodated in the guide tubes 82 of the lower cover 30.

The guide rods 84 respectively accommodated in the guide tubes 82 of the lower cover 30 are configured to guide the up-down movement of the main body 10 with respect to the lower cover 30.

As the fixing bolt 60 is tightened or loosened, the main body 10 is lowered or raised with respect to the lower cover 30. In this case, the guide means 80 serves to guide the up-down movement of the main body 10.

Thus, the up-down movement of the main body 10 is smoothly made without clattering. As a result, the sockets of the main body 10 can be moved upward and downward while maintaining a right posture. This helps significantly enhance the coupling accuracy of the sockets 12 of the main body 10 with respect to the connectors 32 of the lower cover 30.

Consequently, the guide tubes 82 and the guide rods 84 of the guide means 80 can guide the up-down movement of the main body 10 with respect to the lower cover 30, whereby the main body 10 can be smoothly moved upward and downward in a balanced manner. Thus, the sockets 12 of the main body 10 can be raised and lowered while maintaining a stable posture. As a result, the sockets 12 of the main body 10 can be accurately connected to the connectors 32 of the lower cover 30 without the likelihood of poor connection.

The guide tubes 82 and the guide rods 84 of the guide means 80 may be formed in a circular cross-sectional shape or a rectangular cross-sectional shape.

As shown in FIG. 2, the one-bolt type junction box further includes a temporary assembling unit 90 configured to enable the lower cover 30 to be temporarily assembled with the main body 10.

The temporary assembling unit 90 includes a plurality of temporary assembling projections 92 formed on the lateral surfaces of the main body 10 and a plurality of temporary assembling brackets 94 formed in the lower cover 30 so as to be temporarily assembled with the temporary assembling projections 92.

The temporary assembling projections 92 protrude outward from the lateral surfaces of the main body 10 and are formed in pair on the lateral surfaces of the main body 10. In this regard, it is preferred that two pairs of temporary assembling projections 92 are formed the lateral surfaces of the main body 10. However, the present invention is not limited thereto.

The temporary assembling brackets 94 correspond to the temporary assembling projections 92 and extend from the lateral surfaces of the lower cover 30 toward the temporary assembling projections 92 of the main body 10.

The temporary assembling brackets 94 are provided with temporary assembling slots 96 that extend in the vertical direction along the temporary assembling brackets 94. The temporary assembling projections 92 of the main body 10 are inserted into the temporary assembling slots 96.

Thus, the temporary assembling projections 92 are temporarily assembled with the temporary assembling brackets 94, whereby the lower cover 30 having the temporary assembling brackets 94 can be temporarily assembled with the main body 10 having the temporary assembling projections 92. Since the temporary assembling slots 96 of the temporary assembling brackets 94 extend in the vertical direction, the temporary assembling slots 96 allow the main body 10 to move upward and downward with respect to the lower cover 30.

Accordingly, when the fixing bolt 60 is rotated and tightened in a forward direction in a state in which the lower cover 30 is temporarily assembled with the main body 10, the main body 10 is allowed to move downward with respect to the lower cover 30. Thus, the main body 10 and the lower cover 30 are assembled into a single body.

Conversely, when the fixing bolt 60 is rotated and loosened in a reverse direction in a state in which the main body 10 and the lower cover 30 are completely assembled with each other, the main body 10 is allowed to move upward with respect to the lower cover 30. Thus, the main body 10 and the lower cover 30 are dismantled into a temporarily assembled state.

Next, the characterizing parts of the present invention will be described with reference to FIGS. 4 to 6. The same constituent elements as those of the conventional junction box described earlier will be designated by like reference numerals. Duplicate description thereof will be omitted.

Figure 4:
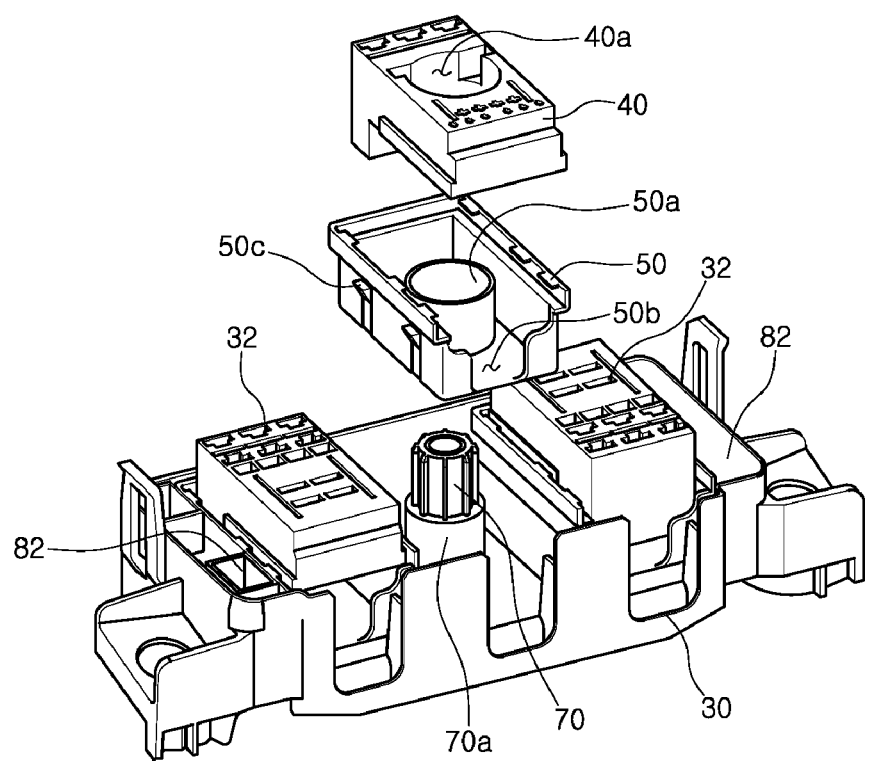
FIG. 4 is an exploded perspective view showing a one-bolt type junction box according to the present invention.
Figure 5A:
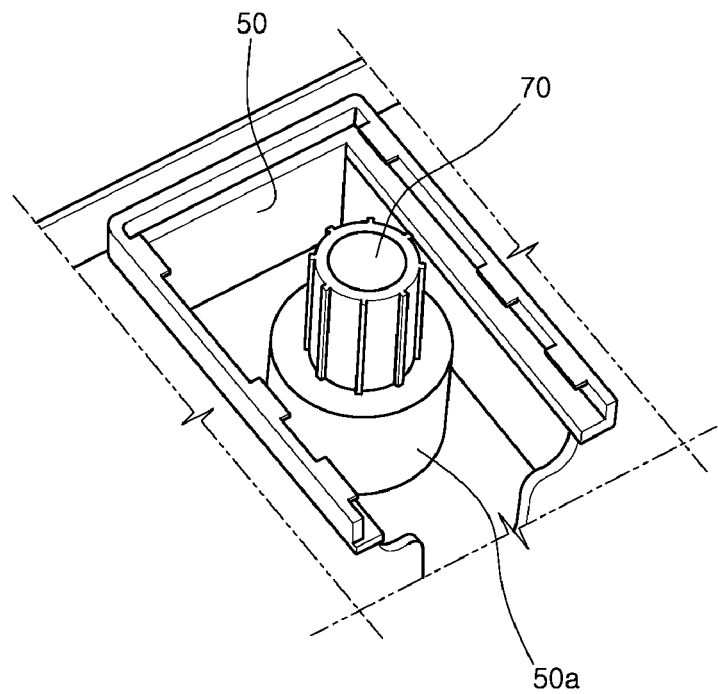
FIGS. 5A and 5B are perspective views showing an assembling process of the one-bolt type junction box according to the present invention.
Figure 5B:
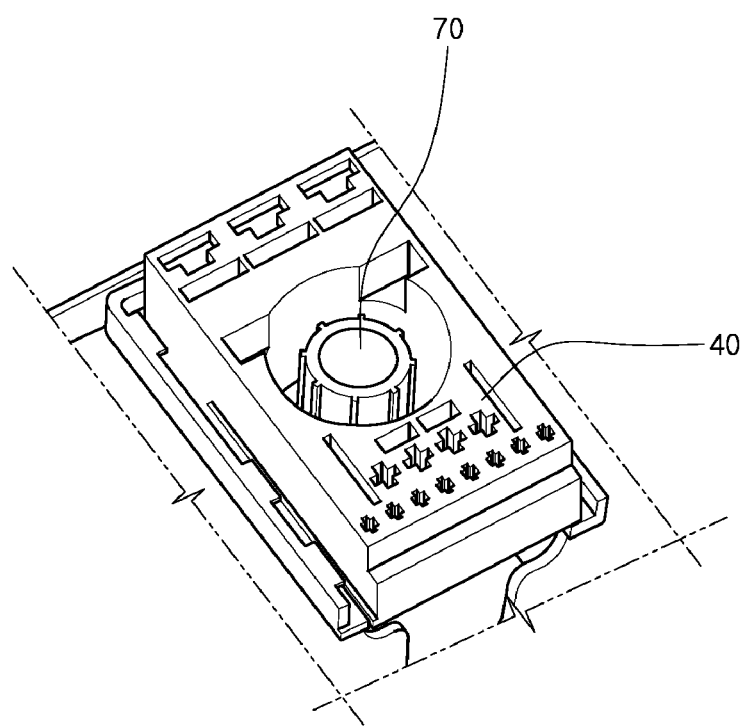
Figure 6:
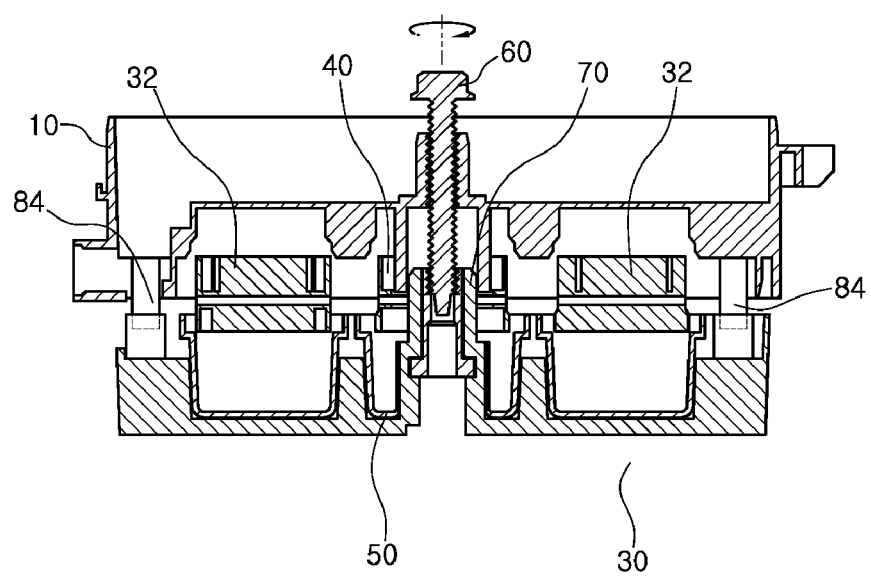
FIG. 6 is a sectional view of the one-bolt type junction box according to the present invention.

Referring to FIGS. 4 to 6, the one-bolt type junction box according to the present invention includes a main body 10 in which electrical parts E are installed, a lower cover 30 configured to cover a lower portion of the main body 10, one or more sockets 12 installed on a lower surface of the main body 10, one or more side connectors 32 installed in the lower cover 30 so as to be coupled to the sockets 12, a single fixing bolt 60 installed in the main body 10, a single fixing nut 70 provided in the lower cover 30 so as to be threadedly coupled to the fixing bolt 60, a central connector 40 mounted in a central portion of the junction box in which the fixing bolt 60 and the fixing nut 70 are disposed, and a connector seating member 50 in which the central connector 40 is seated.

That is to say, in the one-bolt type junction box according to the present invention, the central connector 40 and the connector seating member 50 for accommodating the central connector 40 are provided in the central portion of the junction box in which the fixing bolt 60 and the fixing bolt 60 are disposed.

Furthermore, a central guide portion 70a to which a penetration portion 50a of the connector seating member 50 is fitted is formed in a periphery of the fixing nut 70.

It is preferred that the central guide portion 70a is formed in a circular shape or a rectangular shape. However, the present invention is not limited thereto.

The connector seating member 50 of the one-bolt type junction box according to the present invention is in the form of a rectangular tube with the upper portion thereof opened. The connector seating member 50 includes a penetration portion 50a extending upward from the center of the connector seating member 50 and configured to be fitted to the central guide portion 70a of the fixing nut 70, an opening portion 50b formed on a side surface of the connector seating member 50 so that a wire harness connected to the central connector 40 passes through the opening portion 50b, and engagement projections 50c formed on a side surface of the connector seating member 50 so as to engage with the lower cover 30.

It is preferred that the penetration portion 50a is formed in a circular shape or a rectangular shape. However, the present invention is not limited thereto.

Furthermore, an opening portion 40a through which the penetration portion 50a of the connector seating member 50 passes is formed at the center of the central connector 40.

It is preferred that the opening portion 40a is formed in a circular shape or a rectangular shape. However, the present invention is not limited thereto.

Moreover, the one-bolt type junction box according to the present invention may further include a guide means 80 for guiding the up/down movement of the main body 10 with respect to the side connectors 32 and the central connector 40 of the lower cover 30.

The guide means 80 includes a plurality of guide rods 84 extending from the main body 10 toward the lower cover 30, and a plurality of guide tubes 82 configured to accommodate the guide rods 84 vertically moved together with the main body 10 and installed in the lower cover 30 so as to guide the up/down movement of the guide rods 84.

It is preferred that the guide rods 84 and the guide tubes 82 are formed in a circular cross-sectional shape or a rectangular cross-sectional shape. However, the present invention is not limited thereto.

When the fixing bolt 60 is tightened or loosened, the fixing nut 70 allows the fixing bolt 60 to make a screw motion in the vertical direction so that the main body 10 and the sockets 12 can be moved upward or downward with respect to the side connectors 32 and the central connector 40 of the lower cover 30.

The fixing nut 70 may be insert-molded at the time of injection-molding the lower cover 30 or may be installed in the lower cover 30 by caulking.

Next, the operations and effects of the one-bolt type junction box according to the present invention will be described.

A process of assembling the main body 10, the lower cover 30 and the upper cover 20 will be described with reference to FIG. 3.

First, the fixing bolt 60 is installed in the main body 10 and the two side connectors 32 are installed on the upper surface of the lower cover 30 in a spaced-apart relationship with each other.

Then, as shown in FIG. 4, the central connector 40 is seated on the connector seating member 50. Thereafter, the penetration portion 50a of the connector seating member 50 is fitted to the guide portion 70a of the fixing nut 70.

Thus, as shown in FIG. 5B, the assembling of the lower cover 30, the central connector 40 and the connector seating member 50 is completed. For reference, FIG. 5B shows a state in which only the connector seating member 50 is assembled with the lower cover 30.

In this state, the fixing bolt 60 fitted to the center of the main body 10 is threadedly coupled to the fixing nut 70 of the lower cover 30, the main body 10 is moved downward, whereby the sockets 12 of the main body 10 are coupled to the side connectors 32 and the central connector 40 of the lower cover 30.

At this time, the guide tubes 82 and the guide rods 84 of the guide means 80 can guide the downward movement of the main body 10. Thus, the sockets 12 of the main body 10 are moved downward while maintaining a stable posture. The sockets 12 of the main body 10 are accurately connected to the side connectors 32 and the central connector 40 of the lower cover 30.

When the sockets 12 of the main body 10 are connected to the side connectors 32 and the central connector 40 of the lower cover 30, the main body 10 and the lower cover 30 are in a completely assembled state.

After the main body 10 and the lower cover 30 are completely assembled, the upper cover 20 is coupled to the main body 10.

Thus, the main body 10, the lower cover 30 and the upper cover 20 are assembled into one body, whereby the assembling of the one-bolt type junction box is completed.

A process of separating the main body 10, the lower cover 30 and the upper cover 20 may be performed in an order opposite to the assembling order described above.

The conventional one-bolt type junction box has various advantages over the conventional multi-bolt type junction box. However, in the conventional one-bolt type junction box, the fixing bolt and the fixing nut are provided in the central portion. It is therefore difficult to effectively use the space in the central portion.

Furthermore, the conventional one-bolt type junction box cannot be applied to up-to-date motor vehicles which include three wire harnesses for an engine, a body and a front part.

In order to connect three wire harnesses to a junction box, it is required to provide three connectors. When three connectors are applied to the conventional one-bolt type junction box, it is necessary to increase the size of the junction box or to provide an additional junction box.

In contrast, according to the present invention, it is possible to connect three wire harnesses without increasing the external size of the one-bolt type junction box.

That is to say, it is possible to mount three connectors on the lower cover and to increase the capacity of the junction box while using a mold for the lower cover of the one-bolt type junction box as it is.

This makes it possible to effectively use the space of the junction box and to save the manufacturing cost of the junction box.

While a preferred embodiment of the present invention has been described above, the present invention is not limited to this embodiment. It is to be understood that various changes and modifications may be made without departing from the scope of the invention defined in the claims.

What is claimed is:

1. A one-bolt type junction box, comprising:
a main body in which electrical parts are installed;
a lower cover configured to cover a lower portion of the main body;
sockets installed on a lower surface of the main body;
side connectors installed in the lower cover so as to be coupled to the sockets;
a single fixing bolt installed in the main body;
a single fixing nut provided in the lower cover so as to be threadedly coupled to the fixing bolt;
a central connector mounted in a central portion of the junction box in which the fixing bolt and the fixing nut are disposed; and
a connector seating member in which the central connector is seated, wherein the central connector is configured to be mounted on the lower cover in a state in which the central connector is seated on the connector seating member.

2. The one-bolt type junction box of claim 1, wherein the connector seating member includes a penetration portion, and the fixing nut includes a central guide portion to which the penetration portion of the connector seating member is fitted.

3. The one-bolt type junction box of claim 2, wherein the central guide portion of the fixing nut is formed in a circular shape or a rectangular shape.

4. The one-bolt type junction box of claim 1, wherein the connector seating member has a form of a rectangular tube with an upper portion thereof opened and includes a penetration portion extending upward from a center of the connector seating member and configured to be fitted to a central guide portion of the fixing nut, an opening portion formed on a side surface of the connector seating member so that a wire harness connected to the central connector passes through the opening portion, and engagement projections formed on a side surface of the connector seating member so as to engage with the lower cover.

5. The one-bolt type junction box of claim 4, wherein the penetration portion is formed in a circular shape or a rectangular shape.

6. The one-bolt type junction box of claim 1, wherein the central connector includes an opening portion formed at the center thereof, and the connector seating member includes a penetration portion configured to be inserted into the opening portion.

7. The one-bolt type junction box of claim 6, wherein the opening portion is formed in a circular shape or a rectangular shape.

8. The one-bolt type junction box of claim 1, further comprising:
a guide means configured to guide up-down movement of the main body with respect to the side connectors of the lower cover,
wherein the guide means includes a plurality of guide rods extending from the main body toward the lower cover, and a plurality of guide tubes configured to accommodate the guide rods and installed in the lower cover so as to guide up-down movement of the guide rods.

9. The one-bolt type junction box of claim 8, wherein the guide rods and the guide tubes are formed in a circular cross-sectional shape or a rectangular cross-sectional shape.

10. The one-bolt type junction box of claim 1, wherein the fixing nut is configured to, when tightening or loosening the fixing bolt, allow the fixing bolt to threadedly move upward or downward so that the main body and the sockets are raised or lowered with respect to the side connectors of the lower cover.

11. The one-bolt type junction box of claim 1, wherein the fixing nut is insert-molded when injection-molding the lower cover.

12. The one-bolt type junction box of claim 1, wherein the fixing nut is installed in the lower cover by caulking.

\* \* \* \* \*